United States Patent [19]

Jonas et al.

[11] Patent Number: 5,095,577
[45] Date of Patent: Mar. 17, 1992

[54] AUTOMATIC VACUUM CLEANER

[75] Inventors: Andre Jonas; Bernard Jonas, both of Le Rouret, France

[73] Assignee: Azurtec, France

[21] Appl. No.: 661,227

[22] Filed: Feb. 27, 1991

Related U.S. Application Data

[60] Division of Ser. No. 338,558, Apr. 14, 1989, Pat. No. 5,012,886, which is a continuation of Ser. No. 131,000, Dec. 10, 1987, abandoned.

[30] Foreign Application Priority Data

Dec. 11, 1986 [FR] France .................................. 86 17356
Sep. 8, 1987 [FR] France .................................. 87 12577

[51] Int. Cl.⁵ .............................................. A47L 9/00
[52] U.S. Cl. ........................................ 15/315; 15/319; 15/340.1
[58] Field of Search ...................... 15/319, 320, 340.1, 15/315

[56] References Cited

U.S. PATENT DOCUMENTS

| | | | |
|---|---|---|---|
| 3,713,505 | 1/1973 | Muller | 15/319 X |
| 3,739,421 | 6/1973 | Fukuba | 15/319 |
| 3,952,361 | 4/1976 | Wilkins | 15/319 |
| 4,114,711 | 9/1978 | Wilkins | 15/319 X |
| 4,306,329 | 12/1981 | Yokoi | 15/319 |
| 4,326,317 | 4/1982 | Smith et al. | 15/315 X |
| 4,675,935 | 6/1987 | Kasper et al. | 15/319 |
| 4,700,427 | 10/1987 | Knepper | 15/319 |
| 4,782,550 | 11/1988 | Jacobs | 15/319 X |

Primary Examiner—Chris K. Moore
Attorney, Agent, or Firm—Hoffman, Wasson & Gitler

[57] ABSTRACT

A mobile cleaning apparatus device automatically follows guides such as walls or other obstacles, by engaging the guides with element and controlling the steering of the apparatus in response to the level of forces sensed by the detector.

3 Claims, 10 Drawing Sheets

AUTOMATIC VACUUM CLEANER

BACKGROUND OF THE INVENTION

This is a division of copending application Ser. No. 338,558, filed Apr. 14, 1989, now U.S. Pat. No. 5,012,886, issued May 7, 1991; which is a file wrapper continuation of application Ser. No. 131,000, filed Dec. 10, 1987, now abandoned.

This invention primarily relates to a self-guided mobile unit.

Such mobile units, generally associated with robots, intended to move in an a priori unknown environment, whether it be inside a room or outside, have already been proposed. These units generally require the use of considerable electronic and data processing means intended particularly for recognizing this environment.

Costs result which make them unsuitable for many applications, particularly household applications in the field of eleaning of domestic and industrial rooms. Now, there is a certain demand for such apparatus that can automatically carry out hard tasks such as those of cleaning of rooms.

SUMMARY OF THE INVENTION

This invention aims at providing such a unit at a very low cost, able to constitute, in particular, the body of an automatic cleaning apparatus.

For this purpose, the invention is embodied in a mobile unit such as a cleaning apparatus body, intended to move by following guides such as walls or obstacles, including a chassis, means to support the chassis on the floor, at least one direction and advance element, drive means to drive the direction and advance element in a predetermined direction so as to cause the mobile unit to advance orientation means to cause the direction and advance element to pivot in one direction or the other around an approximately vertical axis, detection means mounted for translational movement in a plane approximately horizontal in relation to said chassis and intended to press on the guides, and control means for the orientation means, designed to cause the direction and advance element to pivot in a first direction in the presence of a reaction lower than a first predetermined threshold exerted on the detection means from the front of the mobile unit in relation to its general direction of advance, and in a second direction in the presence of such a reaction higher than said first threshold.

Consequently, the mobile unit according to the invention can be made very simply and can, if it is desired, use only mechanical or electrical means. The direction and advance element, for example a wheel that can be oriented, can be driven continuously always in the same direction. Surprisingly, it has been found that it is sufficient to orient this direction and advance element in one direction or the other as a function of the reaction exerted on the detection means so that the mobile unit follows its guides which, in the case of a cleaning apparatus, consist simply of the walls and the furniture of the room to be cleaned. Such a mobile unit, in particular, is able to come out of any dead end in which it has been able to enter.

To avoid too great a directional instability, the control means can be designed to inhibit the orientation means in the presence of a reaction on the detection means between said first predetermined threshold and a second predetermined threshold.

In this case, in the absence of an outside disturbance, the mobile unit can follow a rectilinear guide with its direction and advance element in neutral position. The orientation means become operational only when the mobile unit separates from the guide in which case the reaction decreases, or when it presses too strongly on the guide, in which case the reaction increases. In the first case, the orientation means orient the direction and advance element so as to bring the mobile unit back toward its guide, and, in the second case, the orientation means orient the direction and advance element so as to separate it from the guide. Of course, the orientation means also become operational when encountering an obstacle.

Preferably, with an all-or-nothing control of the orientation of the direction and advance element, a proportional control is provided in which said orientation means comprise an electric motor, and said control means comprise a first switch designed to control the rotation of the electric motor in said first direction, a second switch designed to control the rotation of the electric motor in said second direction, and transmission means to transmit the reaction exerted on the detection means to an element for actuating said switches.

In this case, said transmission means can comprise a maneuvering element incapable of horizontal translation with said detection means, but able to slide in relation to the chassis from front to back in relation to the general direction of advance of the mobile unit from a front position where it triggers said first switch to a back position where it triggers said second switch, elastic means being provided to press said maneuvering element toward its front position.

It is understood that these elastic means provide the value of said reaction threshold or thresholds. In the case where the maneuvering element is in its forward position, i.e. in the case of a reaction below the threshold, or further, in other words, when the mobile unit tends to separate from its guide, the first switch is triggered. The electric motor then turns in said first direction, which has the effect of causing the direction and advance element to pivot in the direction where it brings back the mobile unit toward the guide. In the opposite case where the reaction is above the threshold, the maneuvering element slides toward its back position and triggers the second switch. The electric motor then turns in the other direction and causes the direction and advance element to pivot in the direction where it separates the mobile unit from its guide.

In a particular embodiment of the invention, said maneuvering element appears in the form of a triangular structure having its apex directed toward the back and its base directed toward the front and approximately perpendicular to the general direction of advance of the mobile unit, the ends of the base having their movements limited toward the front, and at least partially free toward the back and toward the sides, the apex being able to move from front to back and said structure being able to pivot around said apex.

It can be found that, under these conditions, an action exerted on the detection means from the half-space in front of the mobile unit, is generally translated by a rotation of the maneuvering element around its apex, this rotation in turn producing a recoiling of this apex because of the impossibility for the ends of the base to move forward and the indeformability of the triangular structure.

Such an arrangement can, in particular, be achieved by mounting the apex and the two ends of the base of the triangular structure on the three ends of three rods that are relatively flexible and approximately vertical, each having their other end mounted on the chassis.

More particularly, each of these rods can be engaged in a structural tube mounted on said chassis, said tubes having inside dimensions considerably greater than the diameter of the rods and at least one of said tubes being designed to support said switches.

In a particular embodiment of the invention, the detection means comprise a bumper located on the lower periphery of the unit and constituting said maneuvering element. This bumper makes it possible to detect low objects such as, for example, the base of a lamp.

In addition, there can be provided a cylindrical envelope having an approximately vertical axis mounted to pivot along its lower periphery on said bumper.

Since this cylindrical envelope does not comprise in this embodiment, an upper plate, the cover of the mobile unit according to the invention can be made solid with its chassis.

As has been mentioned, the direction and advance element can consist of a wheel. In this case, this wheel preferably has its approximately horizontal axis situated in a plane offset to the back of said vertical orientation axis when the wheel is in its normal advance position.

A particularly advantageous operation of the mobile unit according to the invention results from this arrangement. Actually, it is found that when the mobile unit separates from its guide, the orientation movement alone of the wheel brings it back to this guide independently even of its movement of advance. Thus, the response time of the device can be limited to the absolute minimum.

In an advantageous embodiment, said detection means comprise a cylindrical hood with a vertical axis that pivots in relation to said axis.

This hood, on the one hand, provides protection for the elements of the mobile unit, and on the other hand, because of its cylindrical shape and its capability of pivoting around its axis, it rolls without rubbing along the guide. In the case of a cleaning apparatus, damaging the walls and furniture is thus avoided.

This cylindrical hood can, in particular, be mounted to pivot on the maneuvering element mentioned above.

To provide an electrical power supply for the mobile unit without the power supply cord hindering its operation, a reel for this cord can be provided, a boom going beyond the upper surface of said unit and whose upper end is designed for the passage of said cord, and guide means to guide the cord from the end of said boom to said reel.

Thus the power supply cord is always taut above the mobile unit.

This invention may also be embodied in a cleaning apparatus such as a vacuum cleaner, having a body consisting of a mobile unit as described above.

This cleaning apparatus can comprise a cleaning element such as a vacuum cleaner nozzle, sweeping means to move said element on the floor approximately perpendicular to the general direction of advance of the mobile unit, so as to sweep a floor strip of a predetermined width, and stopping and starting means to cause the advance of the mobile unit over a distance at least equal to said predetermined width, its stopping during the sweeping of said strip on the floor and its subsequent restarting.

The task of cleaning is thus performed by adjacent or slightly overlapping strips during the periods the mobile unit is stopped. These strips noticeably leave the guide to move away from it, so that the entire surface on the floor of the room is cleaned little by little. Actually, it suffices for this purpose that the sweeping means be able to bring the cleaning element to a distance from the mobile unit at least equal to half the widest dimension of the room.

In a particular embodiment of the invention, the stopping and starting means comprise a cam mounted on the drive means able to cooperate with the element for actuating a control switch of a relay, said relay being designed to supply selectively either the drive means and the orientation means, or the sweeping means.

Said stopping and starting means and said sweeping means can, in particular, be designed to work with end-of-travel switches, to cause the deployment of the cleaning element when the mobile unit is stopped, to cause it to be retracted when it has reached end-of-travel deployed, and to cause the mobile unit to be restarted when the cleaning element has reached end-of-travel retracted.

Said sweeping means can comprise a semirigid tube able to be wound upward in an approximately vertical plane, a reel located in said plane, and means for winding and unwinding said tube on said reel, said cleaning element being mounted at the free end of said tube.

This arrangement is more particularly applicable when the cleaning element is a vacuum cleaner nozzle and said tube consists of the suction tube.

Generally, the reel is located in a vertical plane perpendicular to the general direction of advance of the mobile unit, so as to move the cleaning element more or less perpendicular to the guide of the mobile unit. It will be noted that, in this case, the deployment of the tube can be performed only in a single direction in relation to the general direction of advance, i.e., either on the right, or on the left of the mobile unit. Generally, the mobile unit will be placed so that it advances with its guide on the opposite side to the deployment of the sweeping means. Thus, the cleaning will be performed toward the center of the room. However, it is found that in this case, the portions of the floor located under pieces of furniture of such a height that they do not permit the passage of the mobile unit, will not be cleaned. Therefore, it will be provided to make passes occasionally with the guide situated on the side of the deployment of the sweeping means.

Below will be described reversing and double-switch end-of-travel means for the orientation means, making it possible for the mobile unit to go along its guide at the choice of the user to the right or to the left.

Moreover, it will be noted that said semirigid tube should exhibit a sufficient rigidity to prevent its buckling under the effect of the sweeping means while making possible its winding in a plane. For this purpose, this tube can be equipped with an elastic metal strip.

The winding and unwinding means can comprise a motorized endless belt provided with points on its outer surface, said points being designed to work with holes made in the outer surface of said tube, for example in said metal strip.

According to another embodiment, the winding and unwinding means of the tube comprise a flexible strip, for example metal, fastened at one of its ends to said reel and at its other end to a motorized drum.

This flexible strip can, for example, be wound on the reel while being superposed to said tube.

In the case of a vacuum cleaner, there is advantageously provided, on the lower part of the mobile unit, a hopper provided with a slot crosswise to the general direction of advance near the floor, and with a second slot against which the opening of the nozzle is applied when the latter is in retracted position.

Thus, the cleaning of the floor strip adjacent to the lower part of the guide is assured, for example along the walls. This cleaning is performed during the phases of movement of the mobile unit, by the crosswise slot, since the opening of the nozzle generally consists of a slot approximately parallel to the direction of advance of the mobile unit.

BRIEF DESCRIPTION OF THE DRAWINGS

Particular embodiments of the invention will now be described by way of nonlimiting example, with references to the accompanying diagrammatic drawings in which.

DESCRIPTION OF THE PREFERRED EMBODIMENT

Figure 1:
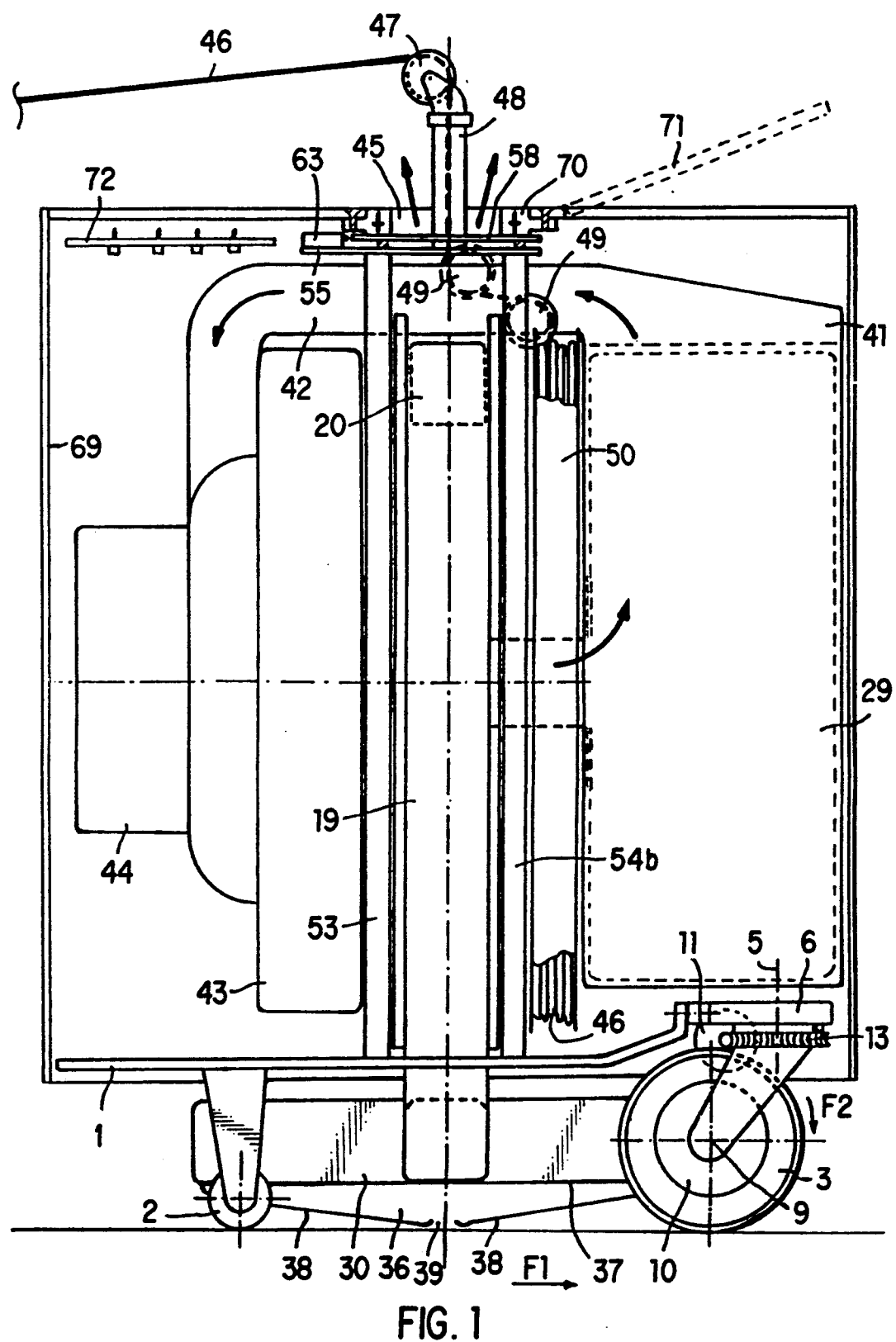
FIG. 1 is a view in axial vertical section of a self-guided vacuum cleaner according to the invention, along a plane parallel to its general direction of advance.

The invention is embodied in a vacuum cleaner represented in the drawings whose general direction of advance is represented by arrow F1, and which comprises a chassis 1 supported on the floor by two small rear wheels 2 mounted idle on their axis and stationary in orientation, and a front steering and drive or advance wheel 3.

Figure 3:
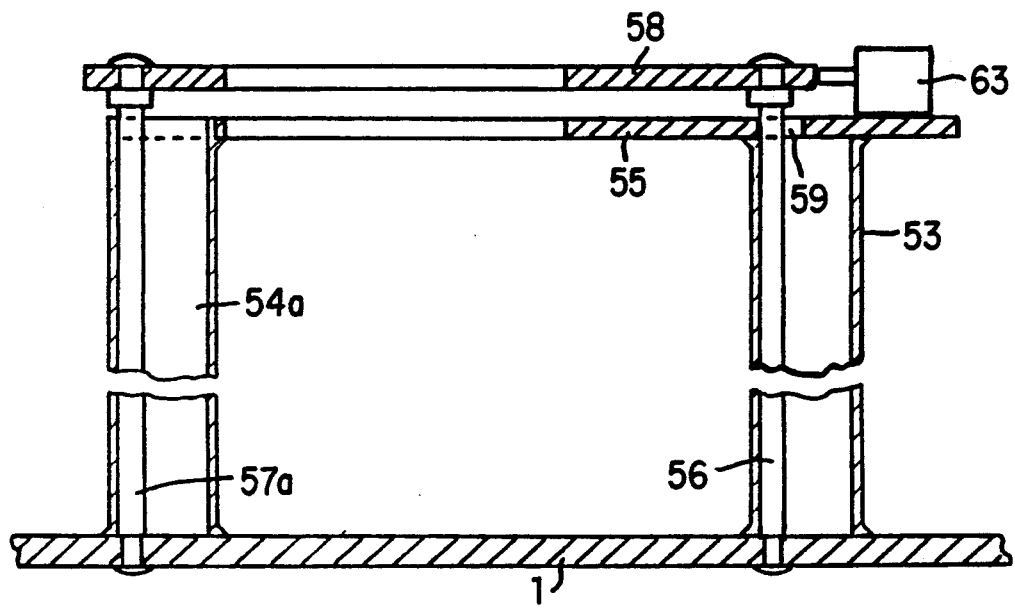
FIG. 3 is a view in section, along line III—III of FIG. 4.
Figure 4:
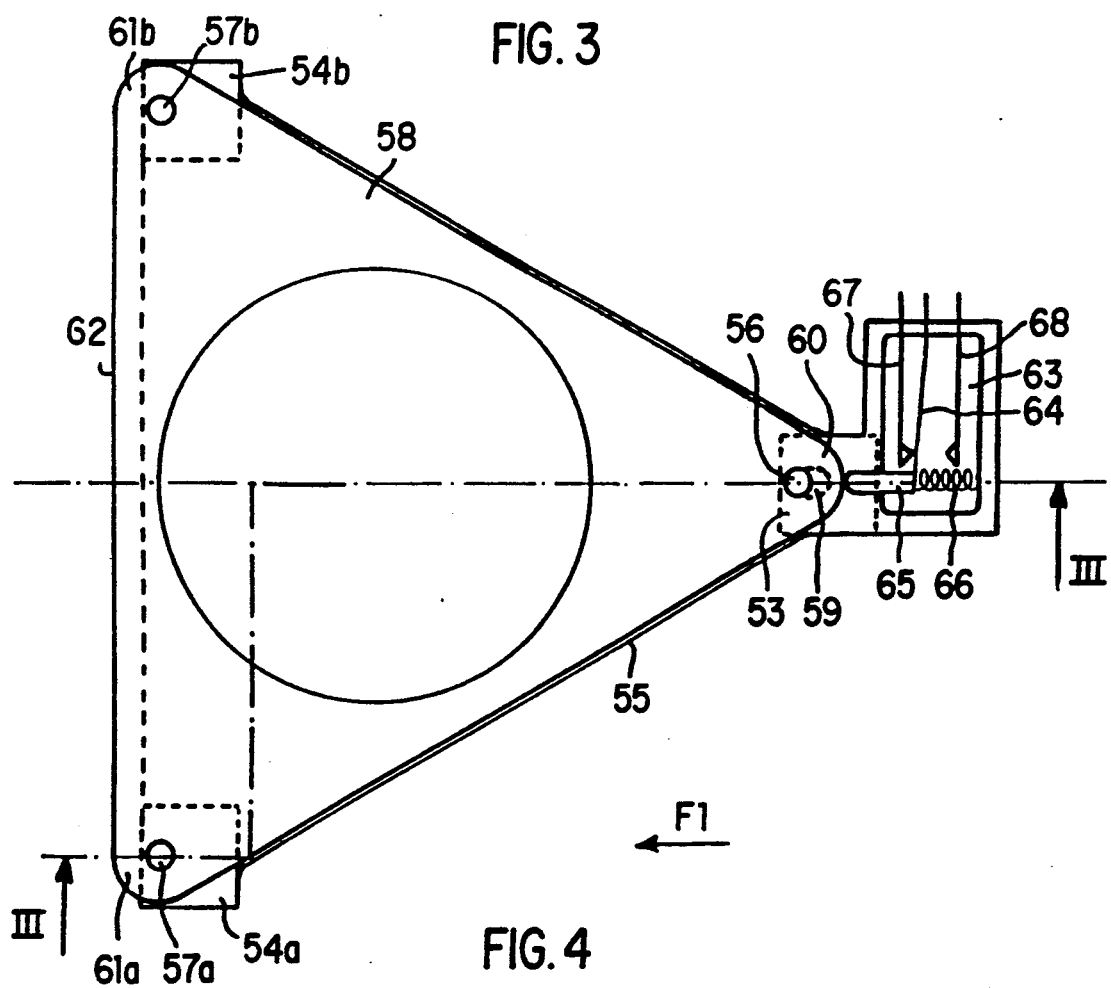
FIG. 4 is a partial top view, on a larger scale, of the vacuum cleaner of FIGS. 1 and 2.
Figure 5:
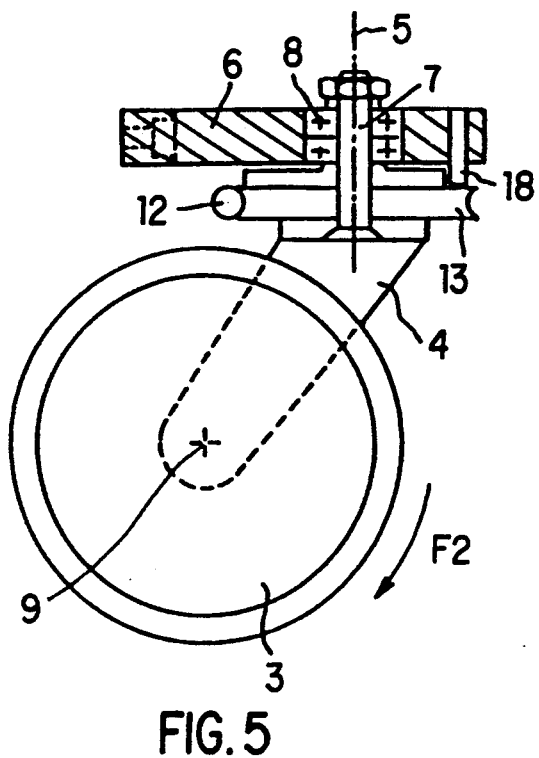
FIG. 5 is a view partially in vertical section of the direction and advance wheel of this vacuum cleaner.

Wheel 3 is mounted on a fork 4 pivoting around an axis 5 in relation to a mounting piece 6 affixed to chassis 1 (FIG. 5). For this purpose, fork 4 is connected to support piece 6 with a shaft 7 by ball bearings 8. When wheel 3 is in its neutral position represented in FIGS. 1, 3 and 5, its horizontal axis of rotation 9 is behind its vertical pivoting axis in relation to direction F1.

Wheel 3 is driven around its axis 9 in the direction of arrow F2 by a motor 10 housed in its hub.

Furthermore, the orientation of wheel 3 around its axis 5 is controlled by a motor 11 mounted on chassis 1, and whose output shaft consists of an endless screw 12 working with a gear 13 keyed on shaft 7.

Two pairs of end-of-travel switches 14a and 14b, on the one hand, and 15a and 15b (FIG. 6), on the other hand, whose function will be described below, are mounted on support piece 6. These switches are designed to work with a projection 16 of a piece 17 attached to fork 4, for rotation therewith. Switches 14a and 15a, on the one hand, and 14b and 15b, on the other hand, are mounted symmetrically in relation to the axis of the apparatus, switches 14a and 15a being behind switches 14b and 15b.

Figure 7:
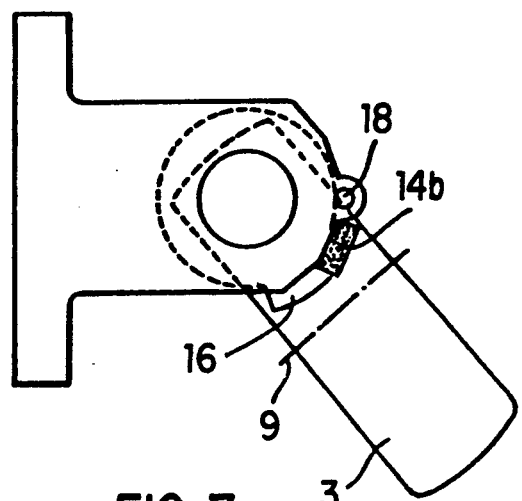
FIGS. 7 and 8 are top views corresponding to FIG. 5 with the direction and advance wheel in its extreme right and left orientations, respectively, for the "right wall" mode of operation.
Figure 6:
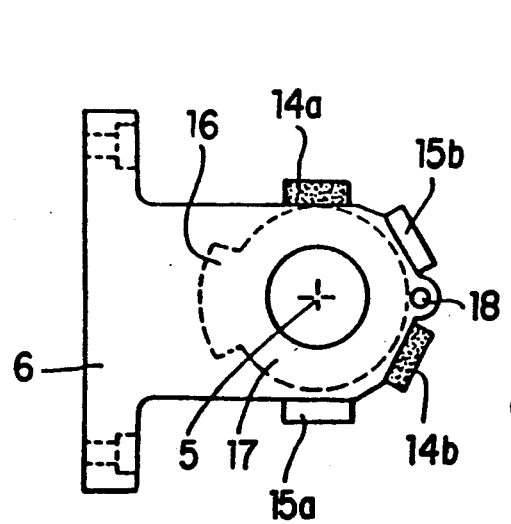
FIG. 6 is a partial top view corresponding to FIG. 5.
Figure 8:
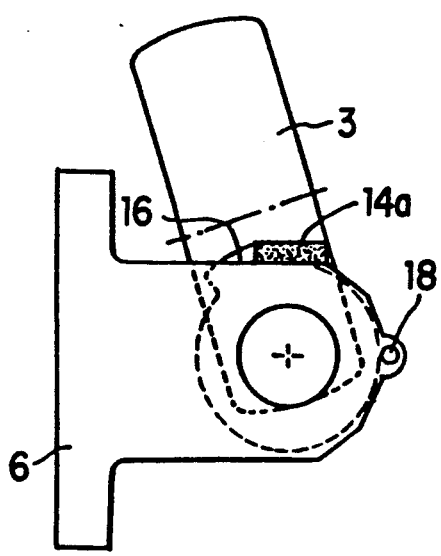
Figure 9:
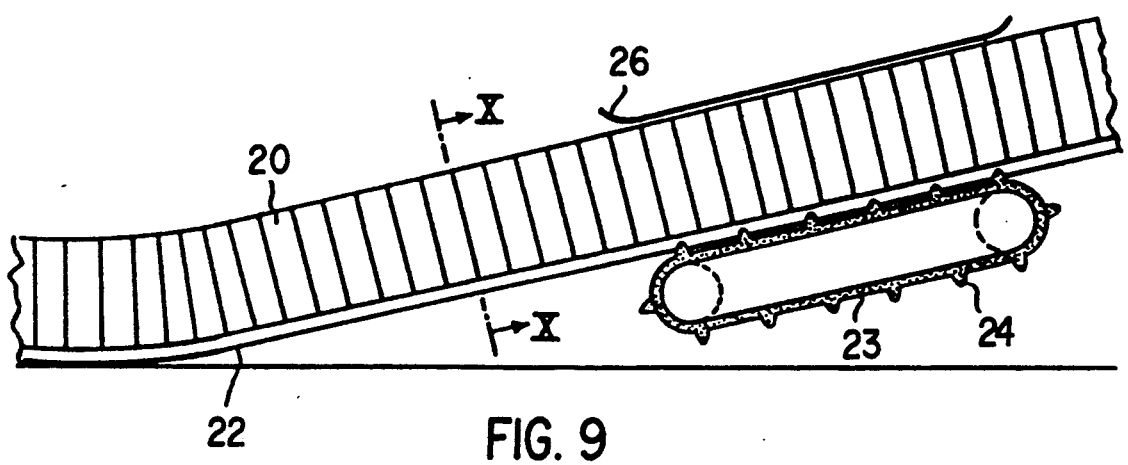
FIG. 9 is a side view of the sweeping means.
Figure 10:
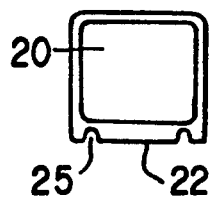
FIG. 10 is a view in section along line X—X of FIG. 9.
Figure 11:
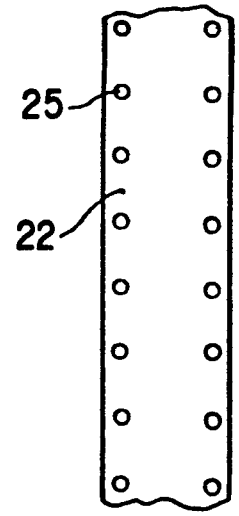
FIG. 11 is a view from below of FIG. 10.

A safety locking pin 18, in addition, is mounted on piece 6, also to work with projection 16, to form a safety stop intended to prevent, as shown in FIGS. 7 and 8, pivoting of wheel 3 around the fork axis 5 greater than a half-turn from its neutral position, shown in FIG. 6.

Figure 2:
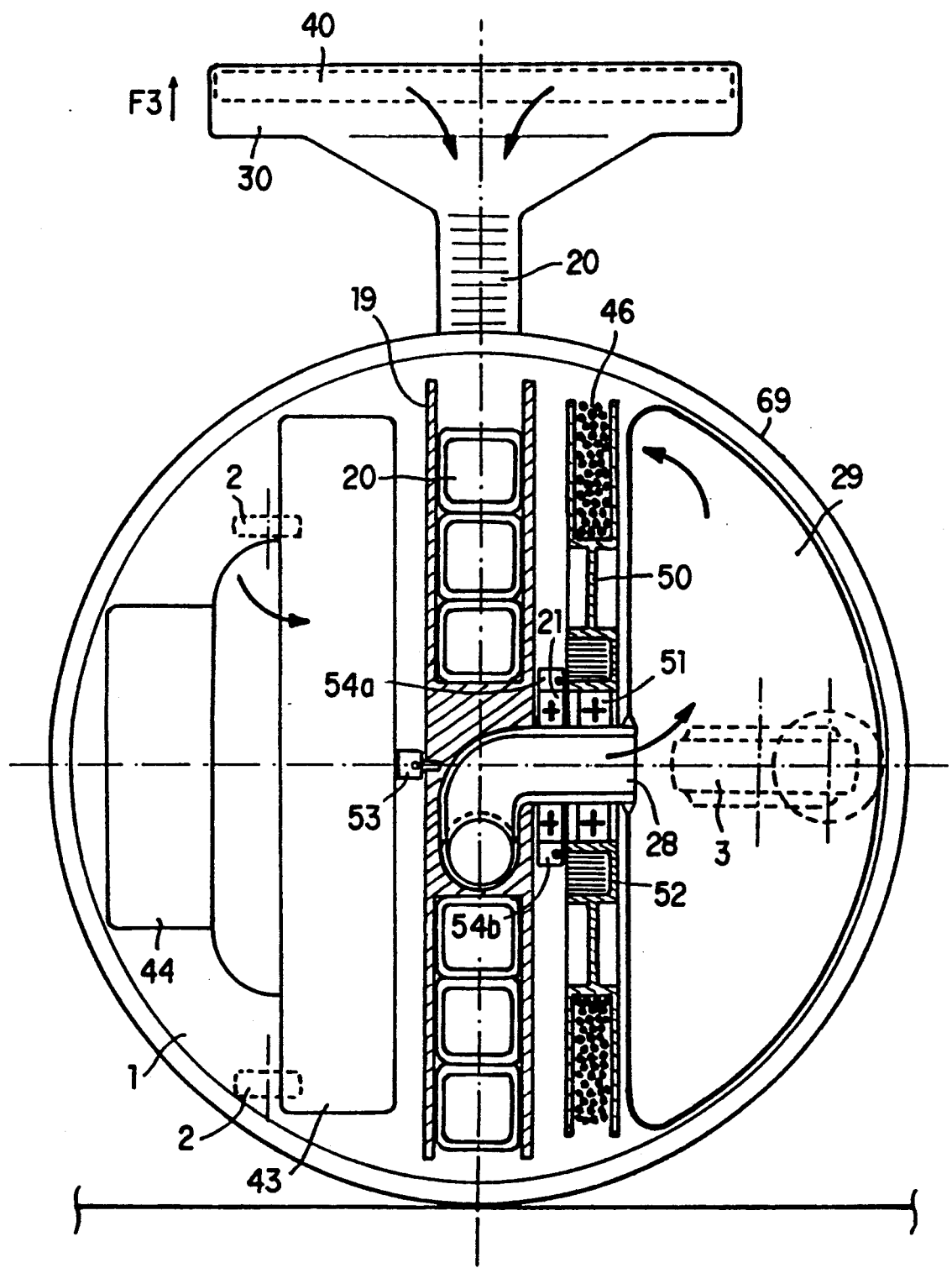
FIG. 2 is a horizontal section.

Chassis 1 also supports a reel 19 for a suction tube 20. Reel 19 is mounted on chassis 1 in a vertical plane perpendicular to direction F1 by a ball bearing 21 (FIG. 2).

Tube 20 has a square cross section and is circumferentially ribbed to allow its winding on reel 19. Furthermore, it comprises on its lower surface an elastic metal strip 22 obtaining for it a certain longitudinal rigidity but allowing its winding.

Figure 12:
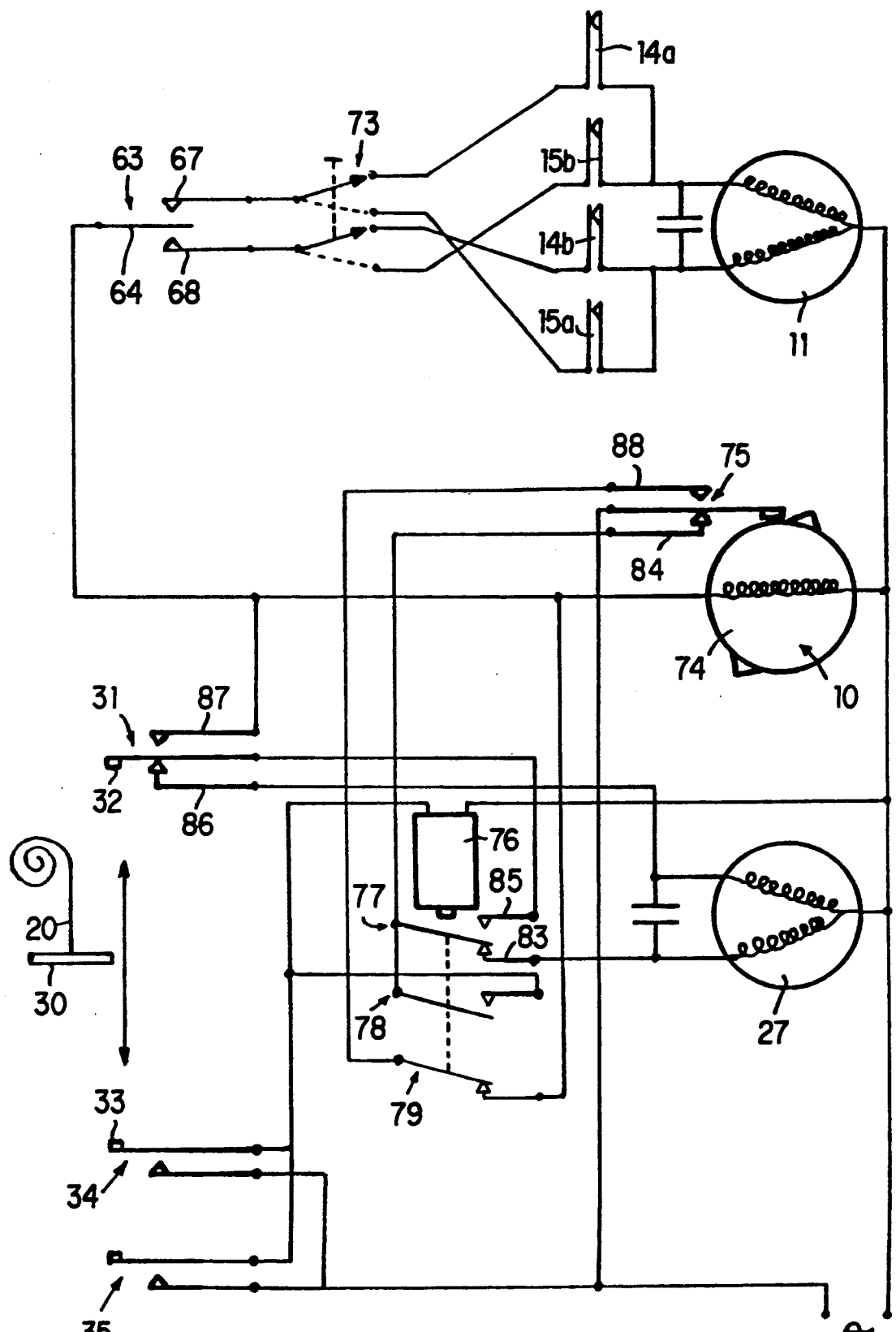
FIG. 12 is an electric diagram of the vacuum cleaner of the preceding figures.
Figure 13:
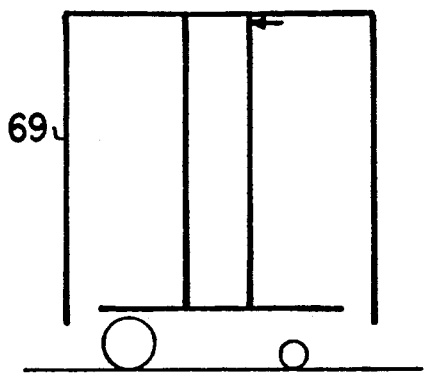
FIGS. 13 and 14 illustrate the operation of the detection hood of this vacuum cleaner.
Figure 14:
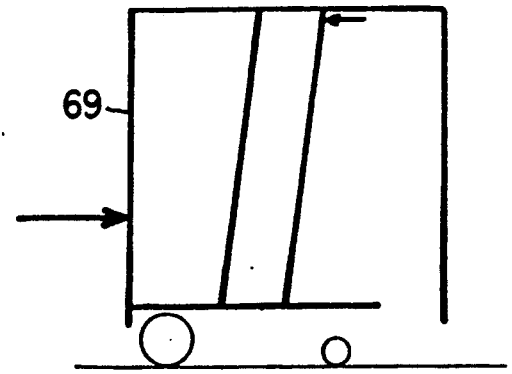

Reel 19 is mounted loose on its axis and the driving of tube 20 in one direction or the other is achieved with an endless belt 23 provided on its outer surface with points 24 able to engage in holes 25 of metal strip 22. An upper guide 26 makes it possible to keep tube 20 applied against endless belt 23. The latter is driven in rotation with a motor 27 (FIG. 12).

At its end connected to reel 19, tube 20 enters by an axial duct 28 into a dust bag 29. At its free end, tube 20 receives a nozzle 30 of a type suited to the surface of the floor which must be treated.

Since reel 19 is located perpendicular to direction F1, tube 20 can be deployed in the direction of arrow F3 (FIG. 2) also perpendicular to F1, or be retracted in the opposite direction, depending on the direction of rotation of motor 27. Nozzle 30, therefore, sweeps strips perpendicular to direction F1.

A retracted end-of-travel switch 31 has its mobile contact 32 able to be actuated by nozzle 30 when it reaches its fully retracted position. Also, mobile contact 33 of a deployed end-of-travel switch 34 is actuated by nozzle 30 when the latter reaches its fully deployed position.

Another switch 35 is mounted on nozzle 30 to detect the contact of an obstacle during the deployment of tube 20.

Moreover, a hopper 36 is mounted on the lower part of chassis 1. This hopper comprises, on the side of the deployment of tube 20, an inclined plane (not shown) on which nozzle 30 can be mounted when it reaches its fully retracted position. Hopper 36 comprises two lateral walls parallel to direction F1, an upper wall 37 and two lower walls 38 delimiting between them a slot 39 in the immediate vicinity of the floor. Slot 39 is perpendicular to direction F1 whereas upper wall 37 comprises a slot (not shown) perpendicular to this direction F1, and to which opening 40 of nozzle 30 is applied when the latter is in its fully retracted position.

Dust bag 29 is located in a housing 41 connected by a duct 42 to a turbine 43 driven by a motor 44. The air carried by opening 40 of nozzle 30, optionally by slot 39 and hopper 36, discharges its dust in bag 29, then goes through duct 42, enters turbine 43, and is finally removed through an opening 45 on the upper part of the apparatus.

Motors 10, 11, 27 and 44 are supplied by an electric cord 46. This cord 46 goes over a pulley 47 mounted on the upper end of a boom 48 that can be oriented around a vertical axis. Cord 46 then goes into boom 48, then over two return pulleys 49 up to a reel 50.

Reel 50 is mounted on the chassis of the apparatus with a ball bearing 51 coaxial with bearing 21, and is equipped with a return spring 52 making it possible to continuously exert a pull on cord 46, so as to keep it taut at the top of the apparatus.

It will be seen in FIG. 2 that reel 29 is located in a diametral plane of the apparatus so as to give the greatest length possible to tube 20, and that reel 50 and turbine 43 are mounted parallel to reel 19 on both sides of the latter. It is thus possible to give a large diameter to turbine 43, which makes it possible to assure a quiet operation of the apparatus.

Now, more particularly, the control system of the apparatus will be described.

Three square-section tubes 53, 54a and 54b are mounted vertically on the chassis and support a plate 55 at their upper part. Tubes 53, 54a and 54b delimit in horizontal section a triangle whose apex consisting of tube 53 is directed toward the back of the apparatus, i.e., on the side opposite arrow F1, while the base consisting of tubes 54a and 54b is directed toward the front in the direction of arrow F1.

Three rods 56, 57a and 57b are placed in tubes 53, 54a and 54b, respectively. The rods have a diameter that is much less that the inner section of the tubes so as to allow them a sufficient clearance. They are mounted at their lower part on chassis 1 and receive at their upper part a triangular structure 58.

Tubes 53, 54a and 54b each have two of their faces parallel to direction F1, and their two other faces perpendicular to this direction. Rods 56, 57a and 57b are mounted at their lower part so as to be almost in contact with the front faces (in direction F1) of tubes 54, 54a and 54b, but can separate from them because of their relative flexibility at their upper part. Moreover, rods 57a and 57b can also slide against the front faces of tubes 54a and 54b.

On the other hand, rod 56 can only separate backward from the front face of tube 53 because it is guided in a longitudinal slot 59 made in plate 55. Apex 60 and ends 61a and 61b of base 62 of structure 58 of course follow the movements of the upper ends of rods 56, 57a and 57b, respectively.

A two-position switch 63 is also mounted on plate 55. Mobile contact 65 of this switch is actuated by a pin 65 kept pressed against apex 60 of triangular structure 58 by a spring 66. In the absence of force exerted on structure 58, spring 66 keeps rods 56, 57a and 57b applied against the front faces of tubes by pin 65, so that the movable contact 65 is connected to front stationary contact 67 of switch 63. On the other hand, when pin 65 is pushed backward by apex 60 of structure 58 against the action of spring 66, mobile contact 64 goes by a neutral position, then is connected to rear stationary contact 68 of switch 63.

The apparatus according to the invention comprises, finally, a cylindrical hood 69 mounted on triangular structure 58 by a ball bearing 70. This hood comprises a trap door 71 that makes it possible to provide access, depending on the angular position of the hood in relation to the chassis, either to dust bag 29, or to a control panel 72 provided, in particular, with a start/stop switch, a flow variator of the turbine, a timing unit, and a "right wall/left wall" reverser 73 (FIG. 12) whose function will be described below.

Reference will now be made more particularly to the electric diagram of FIG. 12 a certain number of elements of which have already been mentioned above in connection with the elements with which they are functionally connected.

Motors 10, 11 and 27 are induction motors operating on the alternating current from the power line. Motor 10 is designed to turn always in the same direction, whereas motors 11 and 27 are equipped in a conventional way with power and self-induction coils that make it possible to select their starting direction.

Stationary contacts 67 and 68 of switch 63 are connected respectively either to switches 14a and 14b, or to switches 15a and 15b, depending on the position of reverser 73 which, in FIG. 12, is in its "right wall" position.

Furthermore, a cam 75 has its rotation connected to that of motor 10 so as to actuate a two=position switch 75. Finally, a triple relay has its coil 76 designed to actuate a two-position switch 77 and two switches 78 and 79.

The connections between the various elements shown in FIG. 12 will be described in detail during the later explanation of the operation of the device.

Figure 15:
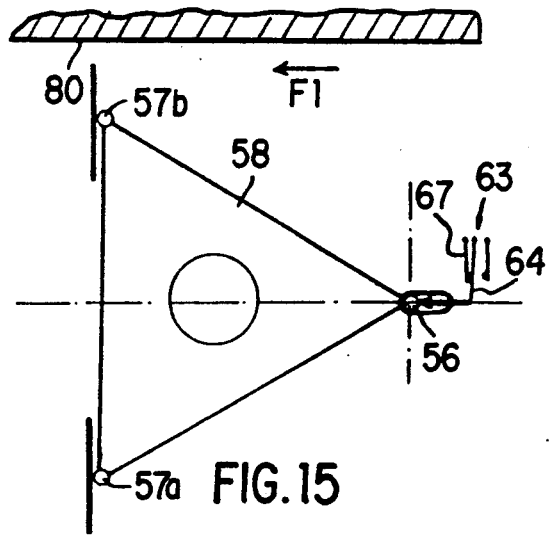
FIGS. 15-18 illustrate the operation of the maneuvering triangle.
Figure 17:
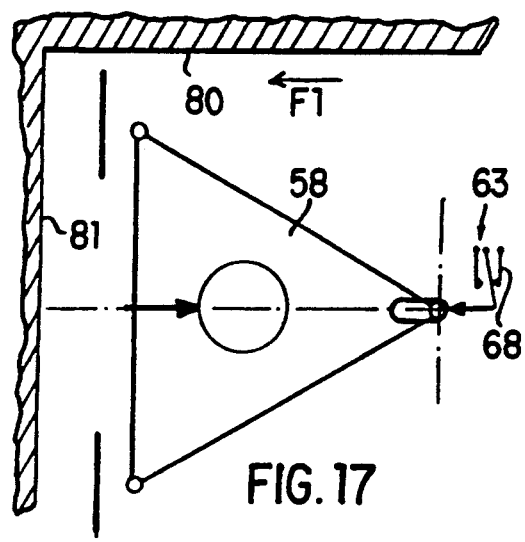
Figure 16:
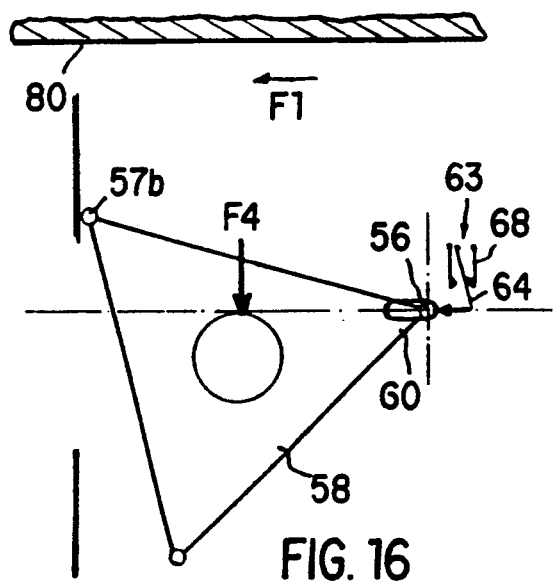

If reference is now made to FIGS. 13-18, it is found in FIG. 15 that, as long as any force is exerted from the front of structure 58 by hood 69, rods 56, 57a and 57b are pressing on the front faces of the tubes (FIG. 13), so that motor 11 can be supplied by mobile contact 64, stationary contact 67, and switch 14a (where reverser 73 is in the position shown in FIG. 12). Thus supplied, motor 11 drives the pivoting of wheel 3 around axis 5 toward the position shown in FIG. 8. If wheel 3 reaches this position, switch 14a is turned off by projection 16, which stops the motor. The apparatus thus reaches its maximum steering lock tending to bring it to wall 80.

If, on the other hand, this wall is reached before switch 14a is turned off, a pressure is exerted on hood 69 and, consequently, on structure 58, in the direction of arrow F4 (FIG. 16), which causes structure 58 to pivot around rod 56, rod 57b remaining pressing on the front face of tube 54b. Because of the indeformability of structure 58, this rotation causes a recoil of rod 56 so that apex 60 of this structure pushes mobile contact 64 backward against the action of spring 66. As long as the mobile contact remains between the two stationary contacts of switch 63, i.e., as long as the reaction on hood 69 remains moderate, motor 11 remains stopped and wheel 3 remains in the same position.

If, on the other hand, force F4 increases, mobile contact 64 supplies motor 11 by stationary contact 68 and switch 14b, which causes motor 11 to cause wheel 3 to pivot toward its position shown in FIG. 7.

If the asymmetrical placement of contacts 14a and 14b in FIG. 6 is observed, it is seen that the maximum wheel deviation (from straight ahead) reached in the position of FIG. 7 (deviation of wheel 3 greater than 90°) is much greater than that reached in FIG. 8 (deviation of wheel 3 less than 90°). When the apparatus goes along an approximately rectilinear wall as in FIGS. 15 and 16, contact 14b will generally not be turned off and wheel 3 will oscillate on both sides of its middle position. The position of FIG. 8 will be reached only during the seeking of a guide wall (described above with reference to FIG. 15) whereas the position of FIG. 7 will be reached only in the case where it will involve coming out of a dead end, as will be described below with reference to FIG. 18.

If now the apparatus encounters a frontal obstacle (FIGS. 14 and 17), structure 58 is pushed altogether backward, so that, here again, the motor will be supplied by stationary contact 68 of switch 63, and switch 14b. Motor 11 will drive wheel 3 toward the position shown in FIG. 7, but when the wheel reaches a 90° orientation in relation to direction F1, the apparatus will pivot until placing itself parallel to the obstacle (wall 81) along which it will follow its path.

Figure 18:
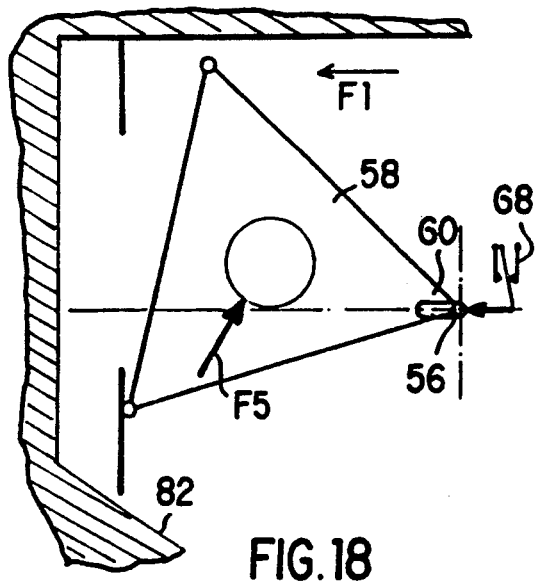

If, finally, it is in the dead end position of FIG. 18, wall 82 will push hood 69 and triangular structure 58 in the direction of arrow F5 and the phenomenon of rotation around rod 56/translation backward of apex 60—described above with reference to FIG. 16 will occur, simply reversed. Motor 11 will always be supplied by stationary contact 68 and switch 14b but, because of the presence of wall 82, the pivoting of the wheel will be able to occur until the position of FIG. 7. Wheel 3, always rotating in the same direction around its axis 9, will then have a tendency to bring the apparatus backward to cause it to come out of the dead end. It has been found that this arrangement made it possible for the apparatus to come out of any dead end in which it was able to enter.

Until now, it has been assumed that reverser 73 was in the position shown in FIG. 12, in which case the apparatus advances with the right wall. It will be found that, if the reverser is placed in its other position, motor 11 is supplied by end-of-travel switches 15a and 15b in a reversed way, and that, consequently, the apparatus will seek a left wall and will advance then with this wall to its left.

If we now return to FIG. 12, it will be found that in fact advance motor 10 and orientation motor 11 are not supplied, but that, on the other hand, motor 27 is in the process of deploying tube 20 by stationary contact 83 of switch 77. When tube 20 reaches end-of-travel, or when an obstacle is encountered by nozzle 20, switch 34 or switch 35, respectively, is turned on, which causes the excitation of coil 76 of the relay. The latter is kept excited by switch 78 and stationary contact 84 of switch 75, which causes the reversal of the direction of rotation of motor 27, through second stationary contact 85 of switch 77 and first stationary contact 86 of switch 31.

Tube 20 then is wound up under the action of motor 27 until actuating mobile contact 32 of switch 31, which stops the winding.

On the other hand, advance motor 10 and orientation motor 11 are supplied by second stationary contact 87 of switch 31 and stationary contact 85 of switch 77.

Cam 74 then makes a half-turn (in the case represented in the figure). At the end of this half-turn, the relay falls back thanks to the cam which actuates contact 84 of switch 75, second contact 88 of this same switch continuing to cause motor 10 to turn until the cam lobe has passed.

The initial position is then regained.

Cam 74 is shaped so that it actuates switch 75 each time that the apparatus advances by a distance slightly less than the width of nozzle 30. Thus, the nozzle works by sweeping successive strips approximately perpendicular to the wall or to the obstacle gone along by the apparatus.

Figure 19:
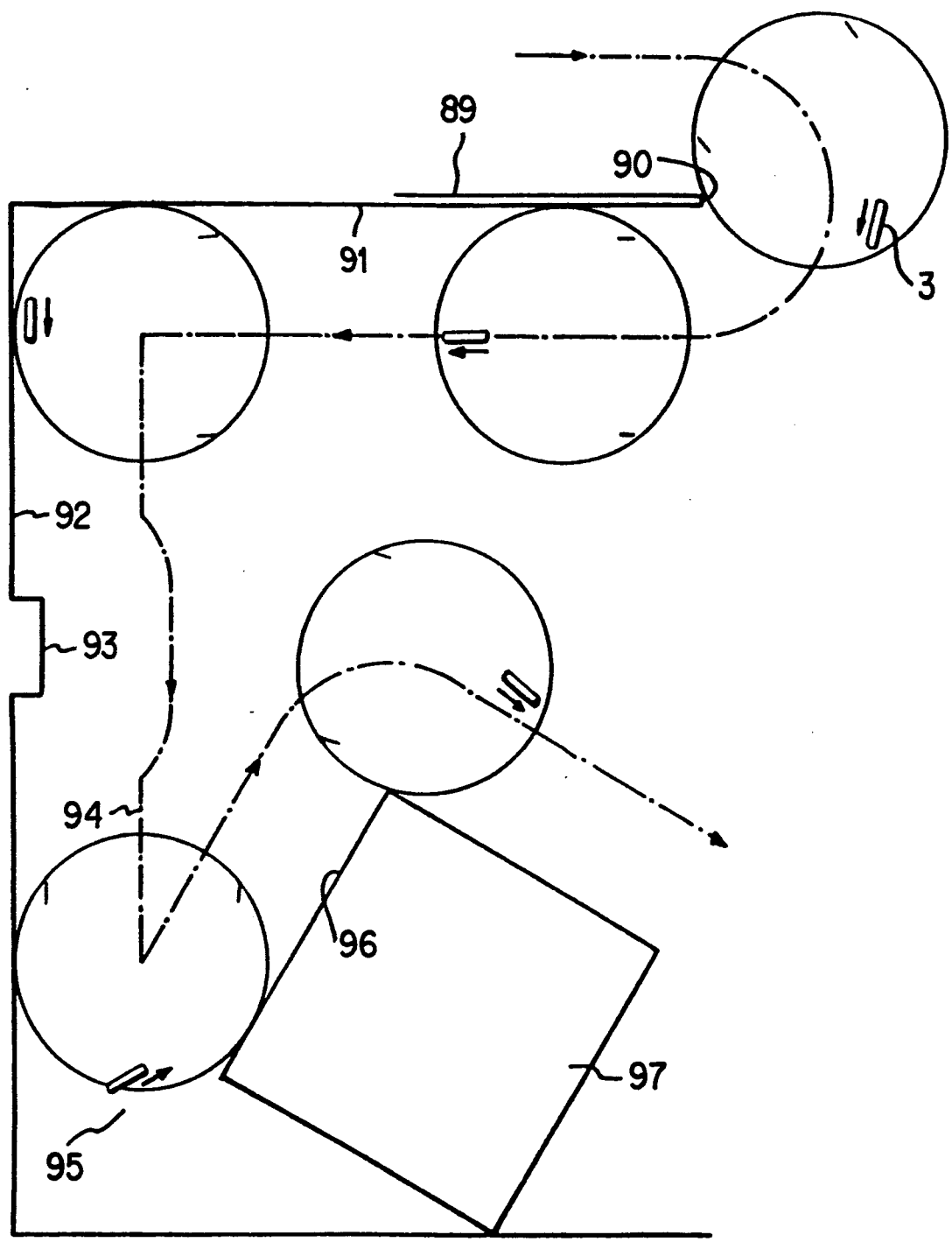
FIG. 19 represents an example of routing of the vacuum cleaner according to the invention.

FIG. 19 represents an example of routing able to be followed by the apparatus.

The apparatus begins by going along wall 89, then pivots around edge 90 consisting, for example, of a doorway (wheel 3 in the position of FIG. 8). It then goes along wall 91 (operation described with reference to FIGS. 15 and 16) until coming up against perpendicular wall 92, turning to the left and moving parallel to this wall (operation FIG. 17). The apparatus then advances along wall 92, being pushed aside laterally to avoid obstacle 93 and enters at 94 into dead end 95. It is then simultaneously in contact with wall 92 and wall 96 of obstacle 97. It comes out of this dead end, as described with reference to FIG. 18, then advances along the walls of obstacle 97 and so on.

During the stoppings caused by cam 74, the apparatus vacuums by successive strips on its left, while during its advance it vacuums under itself by slot 39.

It will be noted that by changing the position of reverser 73, the apparatus could be made to follow the reverse path of that shown in FIG. 19, i.e., that it would operate "left wall." However, since the deployment of tube 20 is always performed on the left of the apparatus, the center of the room would not be treated. On the other hand, nozzle 30 would slide under piece of furniture 97 or to the back of dead end 95.

Figure 20:
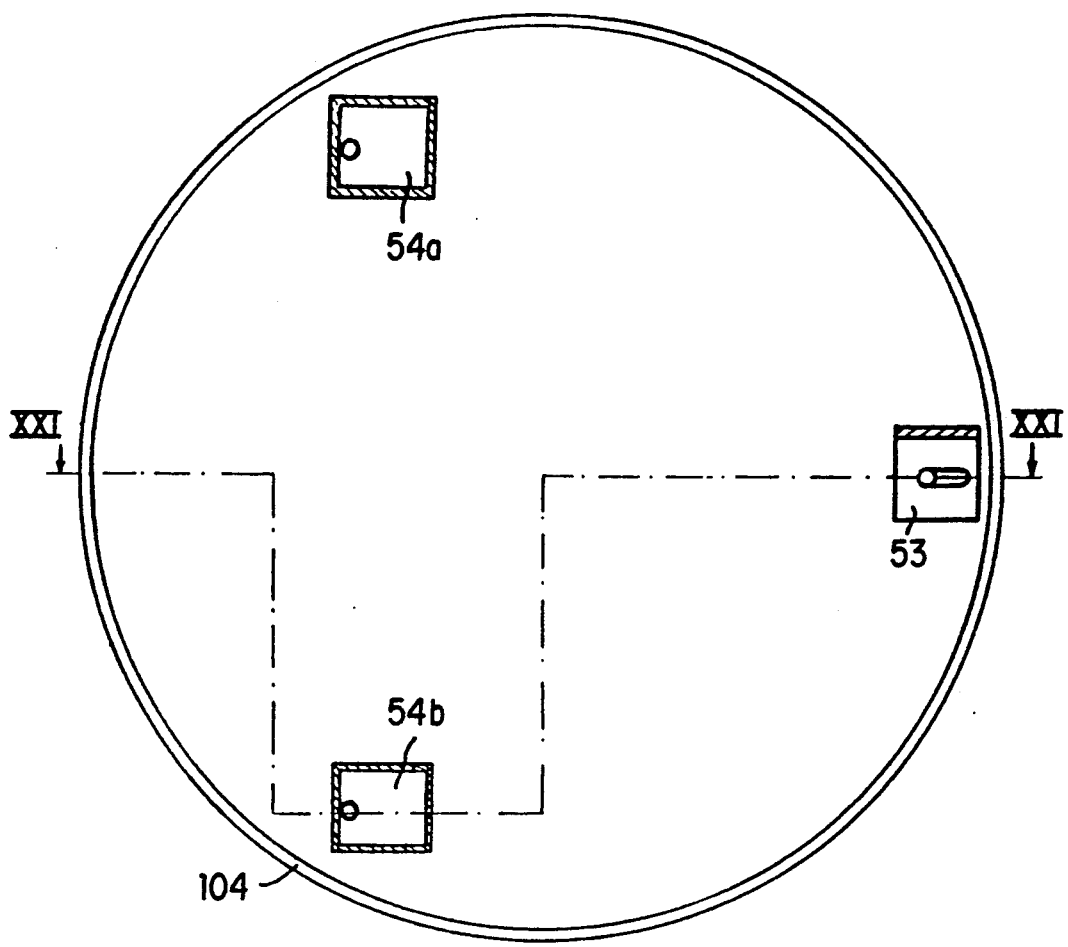
FIG. 20 is a view in horizontal section along line XX—XX of FIG. 21 of a mobile unit according to the invention, according to another embodiment.
Figure 21:
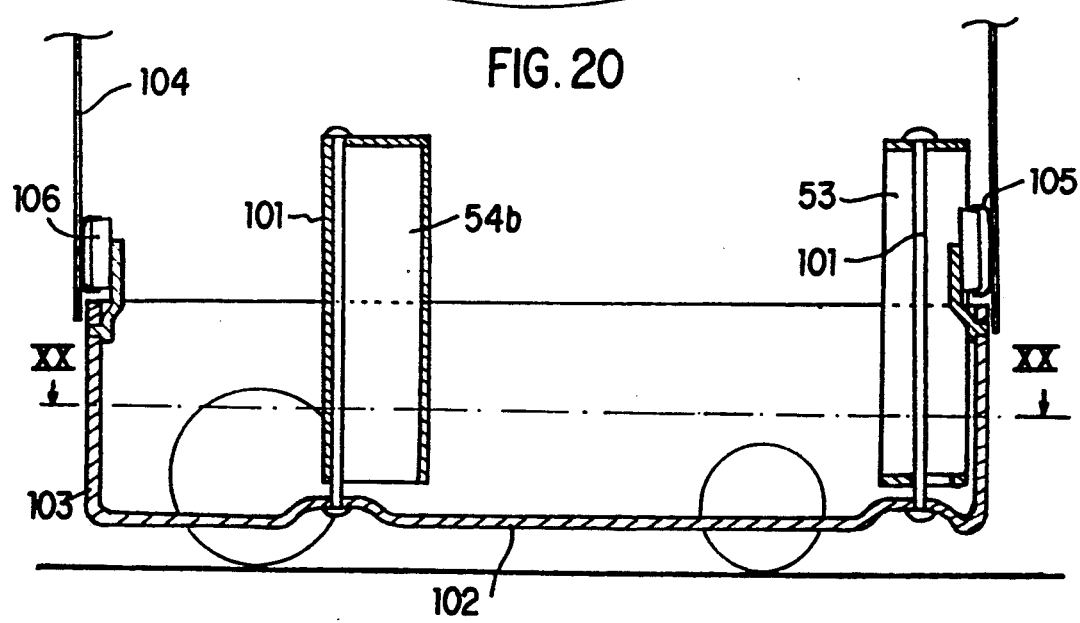
FIG. 21 is a view in section along line XXI—XXI of FIG. 20.

The mobile unit of FIGS. 20 and 21 also comprise a chassis, of which only vertical structural elements 53, 54a and 54b are shown.

However, whereas in the preceding embodiment the connecting rods held in these tubes have their lower end fastened to the chassis, and their upper end free, on the contrary, in the present case rods 101 have their upper end mounted to the chassis and their lower end free and supporting a maneuvering element 102 forming a bumper 103 on its periphery. Consequently, element 102-103 is actually hanging from the frame by rods 101.

Furthermore, a cylindrical envelope 104 is mounted along its lower periphery on the upper edge of bumper 103.

For this purpose, envelope 104 comprises a peripheral rail 105 continuing rollers 106 mounted on bumper 103.

Cylindrical envelope 104 need not cover the upper part of the mobile unite, so the upper hood of the latter is stationary.

The operation of the mobile unit is identical with that previously described, and it reacts as well in contact with a very low obstacle because of bumper 103. For a high obstacle, the detection is performed with envelope 104.

Figure 22:
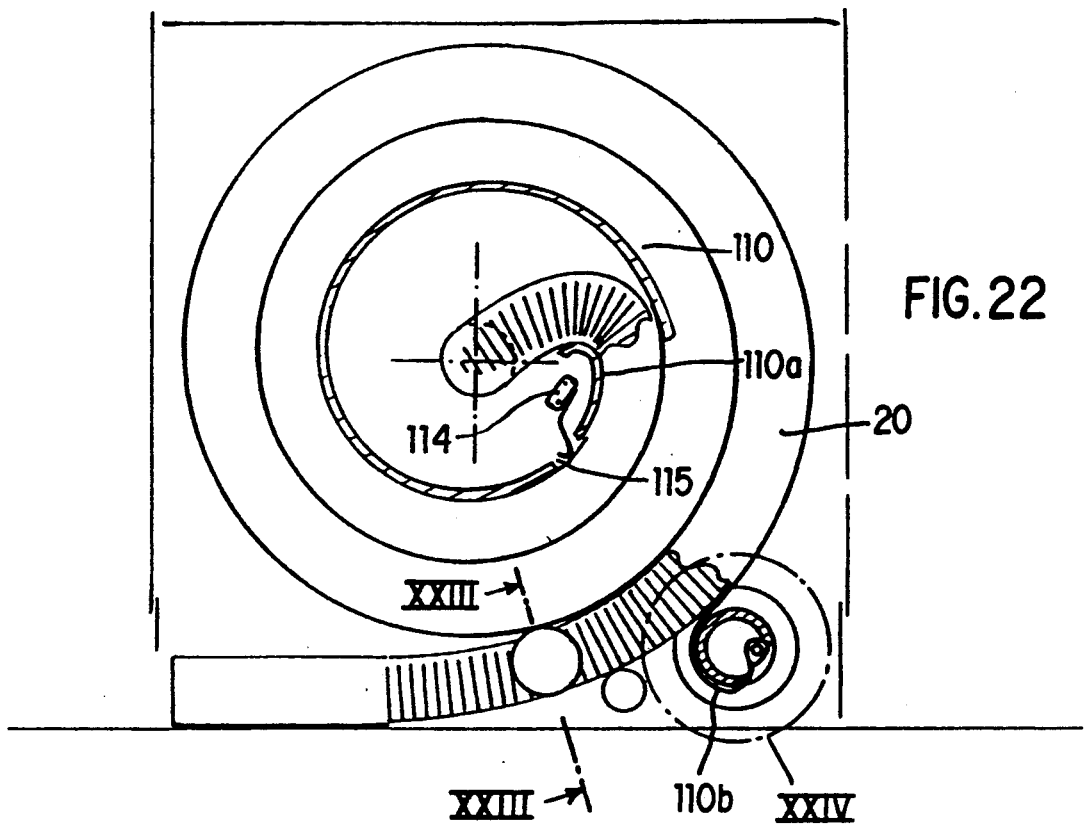
FIG. 22 is a side view of a reel according to another embodiment of the invention.

FIG. 22 shows suction tube 20 wound as before on a reel with a horizontal axis.

However, a flexible blade 110, for example metal, is wound with tube 20.

Strip 110 is fastened at one of its end 110a to the hub of the reel of tube 20, and at its other end 110b to a drum 111 able to be driven with a motor not shown.

End 110b is fastened to drum 111 on the inside of its hub 112 in which it enters through a slot 113.

When the drive motor of drum 111 starts, strip 110 is wound on this drum and, consequently pulls on the reel of tube 20 which is unwound. During this unwinding, the reel stretches a return spring (not shown).

At end-of-travel, a switch 14 working with a hole 115 in the hub of the reel causes the engine to stop when the end of tube 20 takes off from the hub. The return spring then rewinds tube 20 inside the apparatus.

Figure 23:
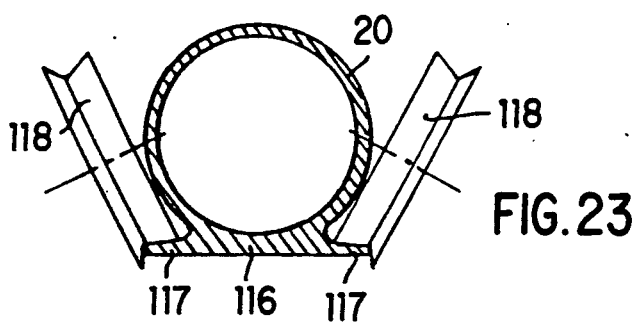
FIG. 23 is a view in section along line XXIII—XXIII of FIG. 22.
Figure 24:
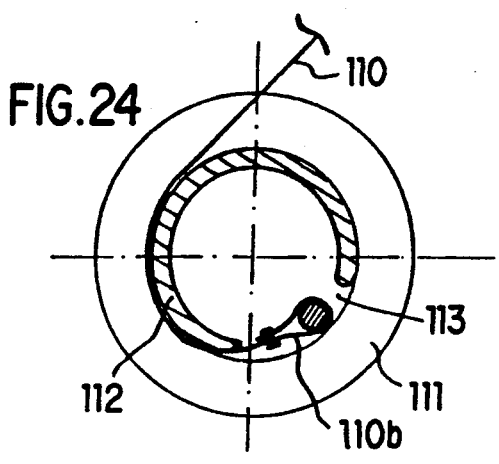
FIG. 24 is a view, on a larger scale, of the detail XXIV of FIG. 22.
Figure 25:
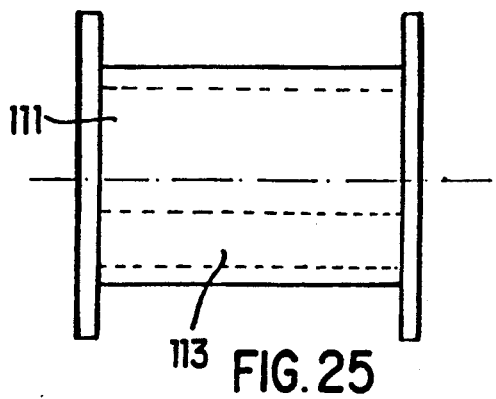
FIG. 25 represents the winding drum of FIG. 24.

Tube 20 can exhibit the section shown in FIG. 23 with a sole 116 forming two projecting lateral strips 117 working with guide rollers 118 facilitating the rewinding of the tube on its reel.

Various variants and modifications can, of course, be made to the preceding description without thereby going outside the scope or the spirit of the invention.

Thus, in particular, other applications of the mobile unit can be envisaged, either in the field of cleaning (polisher, carpet shampooer, etc.) or in other fields.

In addition, it is possible to provide a mercury contact which would totally cut off the electric power supply in case the apparatus were to fall over. It is also possible to provide a level detector in case the apparatus is intended to be used in a room comprising variations in level or unprotected steps.

Further, the suction tube can be made in the shape of an elastic spiral making it possible for it to wind itself around its axis.

What is claimed is:

1. An automatic cleaning apparatus comprising:
a chassis;
means for guiding said chassis along a wall;
a cleaning element mounted so as to sweep a floor strip of a predetermined width perpendicular to said wall; and
stopping and starting means for advancing the chassis over a distance at most equal to said predetermined width, stopping the chassis during the sweeping of said strip on the floor, and subsequently restarting the chassis advance.

2. An automatic cleaning apparatus comprising:
a chassis;
means for guiding said chassis along a wall;
a cleaning element mounted to as to sweep a floor strip of a predetermined width perpendicular to said wall; and
stopping and starting means for advancing the chassis over a distance at most equal to said predetermined width, stopping the chassis during the sweeping of said strip on the floor, and subsequently restarting the chassis advance,
wherein a sweeping means comprises a semirigid tube able to be wound upward in an approximately vertical plane, a reel located in said plane, and means for winding and unwinding said tube on said reel, said cleaning element being mounted at the free end of said tube.

3. The invention of claim 2 wherein said winding and unwinding means comprise a motorized endless belt provided with points on its outer surface, said points being designed to work with holes made in the surface of said tube.

* * * * *